United States Patent
Sinha et al.

(10) Patent No.: US 7,295,601 B1
(45) Date of Patent: Nov. 13, 2007

(54) METHOD AND APPARATUS FOR PERFORMING DIGITAL TIMING RECOVERY ON OVERSAMPLED 802.11B BASEBAND SIGNALS

(75) Inventors: Amit Sinha, Acton, MA (US); William Gardei, Derry, NH (US)

(73) Assignee: Edgewater Computer Systems, Inc., Ottawa, Ontario (CA)

( * ) Notice: Subject to any disclaimer, the term of this patent is extended or adjusted under 35 U.S.C. 154(b) by 673 days.

(21) Appl. No.: 10/639,384

(22) Filed: Aug. 12, 2003

Related U.S. Application Data (60) Provisional application No. 60/402,803, filed on Aug. 12, 2002.

(51) Int. Cl.
*H04B 1/38* (2006.01)

(52) U.S. Cl. ............. 375/222; 370/395.62; 375/134; 375/326; 375/329; 375/331; 375/343; 375/344; 375/355

(58) Field of Classification Search .......... 375/222, 375/316, 349, 333, 343; 708/313
See application file for complete search history.

(56) References Cited

U.S. PATENT DOCUMENTS

| | | | | |
|---|---|---|---|---|
| 5,410,621 A | * | 4/1995 | Hyatt | 382/260 |
| 5,475,705 A | * | 12/1995 | Dent | 375/333 |
| 5,699,389 A | * | 12/1997 | Beladi et al. | 375/371 |
| 6,130,920 A | * | 10/2000 | Powell et al. | 375/343 |
| 6,519,302 B1 | * | 2/2003 | Bruce et al. | 375/355 |
| 6,657,678 B1 | * | 12/2003 | Mizukami et al. | 348/726 |
| 6,847,694 B1 | * | 1/2005 | Chevrette et al. | 375/365 |
| 2003/0228855 A1 | * | 12/2003 | Herz et al. | 455/185.1 |

* cited by examiner

*Primary Examiner*—David C. Payne
*Assistant Examiner*—Adolf DSouza
(74) *Attorney, Agent, or Firm*—Daly, Crowley, Mofford & Durkee, LLP

(57) ABSTRACT

An apparatus and method for performing digital timing recovery includes a rotating demultiplexor receiving a four times oversampled baseband signal and providing four downsampled phases at respective outputs. Each output is processed by a correlation detector which computes a peak sum signal for each downsampled phase. The peak sum signals are processed to produce a best phase select output signal. The best phase select output signal is used to select the optimum sampling phase. Symbol timing is then determined based on the relative peak offset in the best downsampled phase.

17 Claims, 7 Drawing Sheets

METHOD AND APPARATUS FOR PERFORMING DIGITAL TIMING RECOVERY ON OVERSAMPLED 802.11B BASEBAND SIGNALS

CROSS REFERENCE TO RELATED APPLICATIONS

This application claims priority under 35 U.S.C. §119 (e) to provisional application Ser. No. 60/402,803 filed Aug. 12, 2002, the disclosure of which is hereby incorporated by reference.

STATEMENT REGARDING FEDERALLY SPONSORED RESEARCH

Not Applicable.

FIELD OF THE INVENTION

The present invention relates generally to timing recovery and more specifically to a method and apparatus for performing timing recovery of oversampled 802.11b baseband signals.

BACKGROUND OF THE INVENTION

Wireless local area networks have become prevalent with the standardization of the IEEE 802.11 family of protocols. In particular, the IEEE 802.11b standard, offering data rates up to 11 Mbps, has been widely adopted by numerous access points and network interface card manufacturers. These networks use the wireless medium in the 2.4 GHz ISM (Industrial, Scientific and Medical) band as the transmission channel.

Spread spectrum communications provide efficient utilization of signal bandwidth and power. An advantage of a spread spectrum communication system is its ability to reject interference whether it is unintentional interference by another user simultaneously attempting to transmit through the channel, or the intentional interference by a hostile transmitter attempting to jam the transmission. Spread spectrum communications also provide excellent narrow-band noise rejection characteristics.

Spread spectrum communication systems spread a baseband digital signal with a periodic binary sequence, noise-like in nature, called a pseudo random noise (PN) sequence. Through this spreading technique, the relatively narrow-band digital baseband signal is made to appear as wide band noise. Furthermore, the receiver knows the pseudo random noise sequence used by the transmitter in order to properly recover the transmitted signal. Any other additional receiver listening on the channel will not be capable of recovering the transmitted message without the correct pseudo random noise sequence, hence the secure nature of this type of communication.

The same pseudo random noise sequence used to de-spread the received signal, that is, convert the wide band signal to a narrow band signal, will spread any narrow band noise, such as jamming signals, to a wide band signal. In effect, this makes narrow band noise appear as wideband noise at the receiver input, improving performance.

In a Spread Spectrum communications system, a pseudo random noise sequence is used to convert a narrow-band digital signal to a larger bandwidth signal, referred to as a spread signal. To transmit the spread signal through a channel such as air, the signal is modulated and mixed with a sinusoidal carrier to translate it to the appropriate frequency band.

Synchronization is of concern with the recovery of the baseband digital signal. For proper operation, a spread spectrum system requires that the locally generated pseudo random noise sequence used to de-spread the received signal be synchronized to the pseudo random noise sequence used to spread the transmitted signal.

When a locally generated pseudo random noise sequence is compared to an interval of the received signal, a measure of correlation is used to determine when the two signals are satisfactorily aligned. After alignment, the remaining received signal is then correlated with the pseudo random noise sequence and the received signal is properly de-spread using a matched filter and the baseband digital data is properly recovered.

The single sided spectral occupancy of a baseband 802.11b compliant signal is restricted to within 11 MHz. Traditional 802.11b compliant systems have used a 22 MHz (2×) sampling rate to capture the baseband spectrum using an Analog to Digital Converter (ADC). The output of the ADC is passed on to a digital baseband processor that implements timing recovery, equalization and demodulation.

Traditionally, 802.11b receivers have been narrow band. This implies that the RF (Radio Frequency) frontend and the ADC grab only as much spectrum as is required to process a single 802.11b channel. The evolution of higher sampling rate and higher precision ADCs has enabled a new class of digital baseband architectures that can process multiple channels simultaneously. A problem associated with such architectures is how to determine optimum sampling points in the received baseband signal.

SUMMARY OF THE INVENTION

An apparatus for performing digital timing recovery includes a demultiplexor receiving a four times oversampled baseband signal and providing four downsampled phases at respective outputs. Each output is processed by a correlation detector which computes a peak sum signal for each downsampled phase. The peak sum signals are processed to produce a best phase select output signal. The best phase select output signal is used to select the optimum sampling phase. Symbol timing is then determined based on the relative peak offset in the best downsampled phase.

A method for performing digital timing recovery includes demultiplexing a baseband signal to provide multiple downsampled phases. Processing of the downsampled phases is performed to compute a peak sum signal for each downsampled phase. The peak sum signals are analyzed to provide a best phase select signal and this signal is used to select the optimum sampling phase. Symbol timing is then determined based on the relative peak offset in the best downsampled phase.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
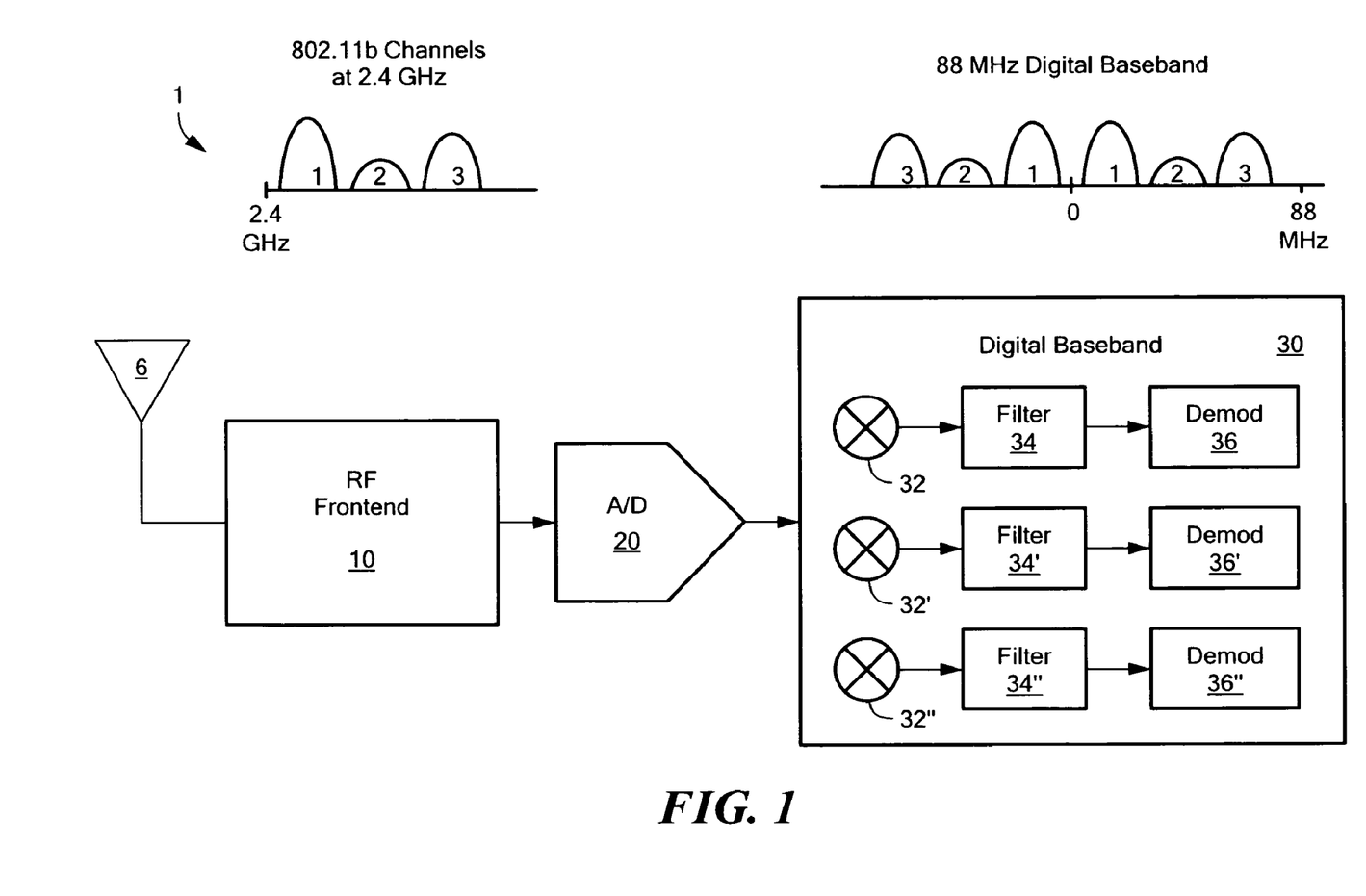
FIG. 1 comprises a block diagram of a wideband system architecture.

Referring to FIG. 1, an example wideband architecture 1 is shown. The architecture includes an antenna 5 for receiving a signal spectrum and supplying the received signal spectrum to an RF frontend 10. The RF frontend 10 is in communication with an Analog to Digital Converter (ADC) 20. The ADC 20 provides its output to a digital baseband processor 30.

In this architecture 88 Mhz of the spectrum at 2.4 GHz is captured by the RF frontend 10 and is digitized using a 176 Msamples/s ADC 20. This architecture can accommodate three 802.11b channels separated by 25 MHz in center frequency. The digital baseband processor 30 uses digital mixers (32, 32' and 32") along with channel extraction and rate conversion filters (34, 34', and 34") to extract and demodulate the individual channels which are then passed to demodulators (36, 36' and 36") for decoding. Such wideband systems can substantially improve bandwidth utilization (providing higher throughputs) and reduce system cost through integration. Similar wideband architectures can also be used in a software radio that grabs large chunks of spectrum and processes it digitally based on different protocols and standards.

Figure 2:
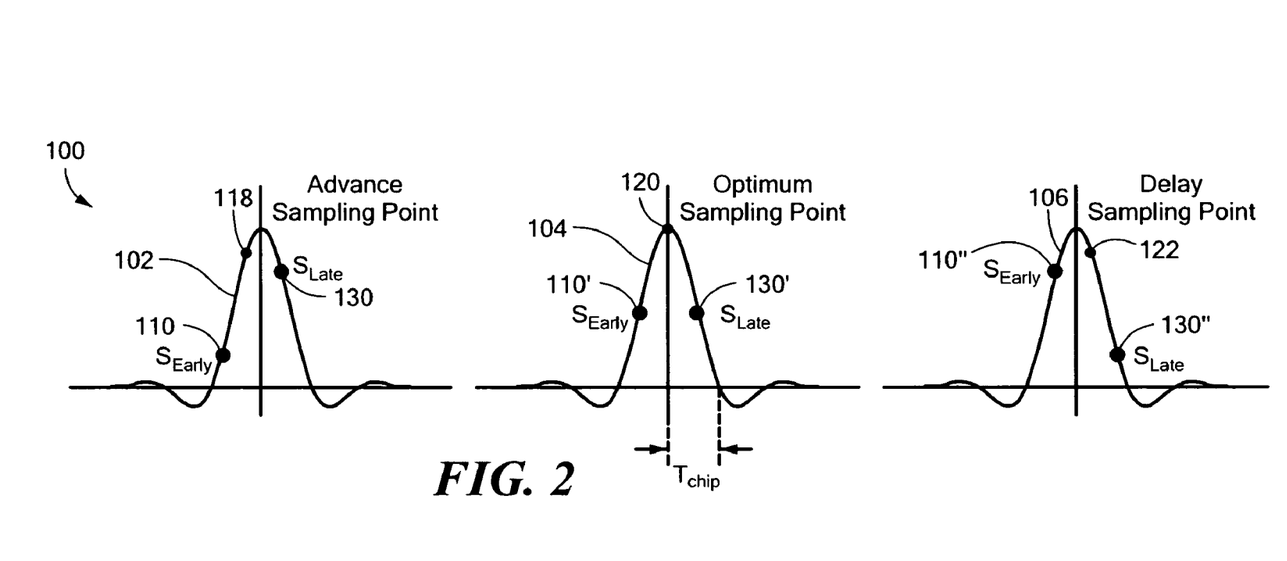
FIG. 2 is a series of graph showing optimum sampling point determination using Early-Late correlators.

One of the advantages of a wideband architecture is the oversampled nature of the component narrowband signals. Oversampling is used to reduce noise and improve the performance of the receiver. Timing recovery is one of the most critical functions performed by a communications receiver. A timing recovery circuit essentially determines the optimum sampling points in the received baseband signal. The timing recovery circuit is also used to detect symbol and frame boundaries in the receiver. FIG. 2 illustrates the basics of timing recovery using the popular early-late correlation scheme used in spread spectrum signals.

Two chip rate correlators are used to match filter the received stream (1 chip apart) based on the spreading code. The analog domain correlation output is shown by the continuous curves 102, 104 and 106 of FIG. 2, each of which include an early sampling point ($S_{Early}$ 110, 110' and 110") and a late sampling point ($S_{Late}$ 130, 130' and 130"). Curve 102 includes an advance sampling point 118, curve 104 includes an optimum sampling point 120 and curve 106 includes a delay sampling point 122. The difference between the correlation outputs drives the optimal sampling point backwards or forwards.

Figure 3:
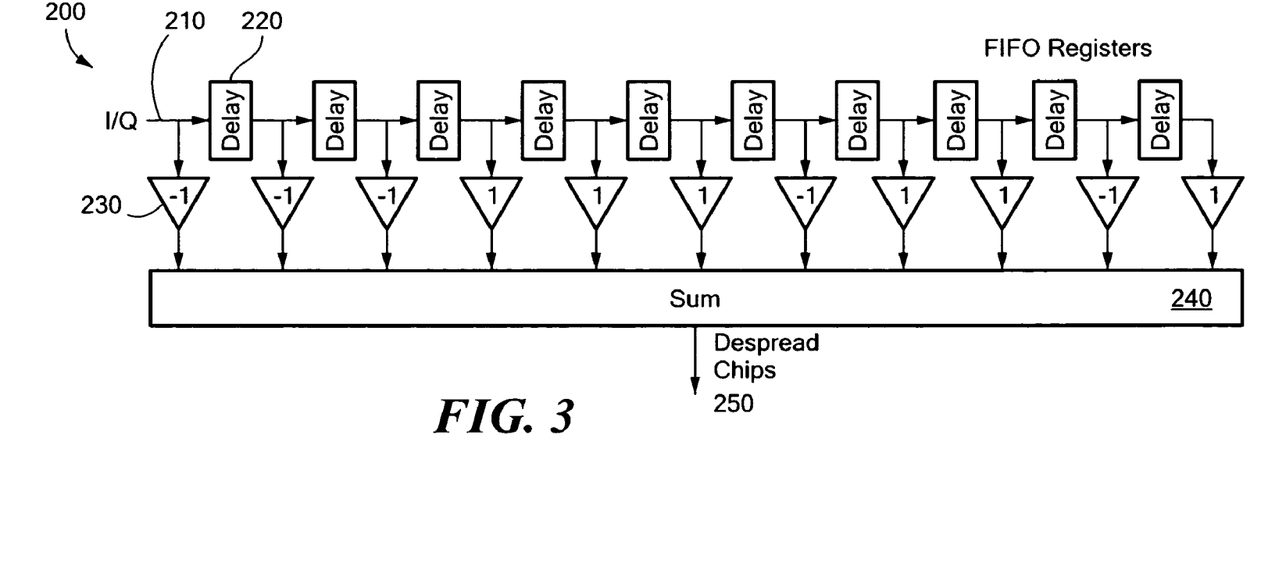
FIG. 3 is a block diagram of a barker correlator.

Adjusting sampling points in the analog domain is nontrivial. Classical narrow band systems accomplished this using digital interpolation between the early and late sampling points. With oversampled digital streams, sampling point adjustments need not involve interpolation and are done by choosing just the right sampling phase. In 802.11b compliant packets, timing recovery can be preformed during the preamble. An 802.11b preamble consists of 144 scrambled ones (long preamble) or 56 scrambled zeroes (short preamble) (See section 18.2.2 of IEEE Std 802.11b-1999). In both cases, the preamble bits are Differential Binary Phase Shi Key (D-BPSK) modulated and spread using an 11 chip Barker code. The Barker correlator 200 used at the receiver is shown in FIG. 3. The Barker correlator includes an 11 tap matched filter 220 with transposed Barker coefficients 230. When a valid Barker sequence is passed through the correlator 200 it produces an amplitude peak at the output 250 of Sum circuit 240.

Figure 4:
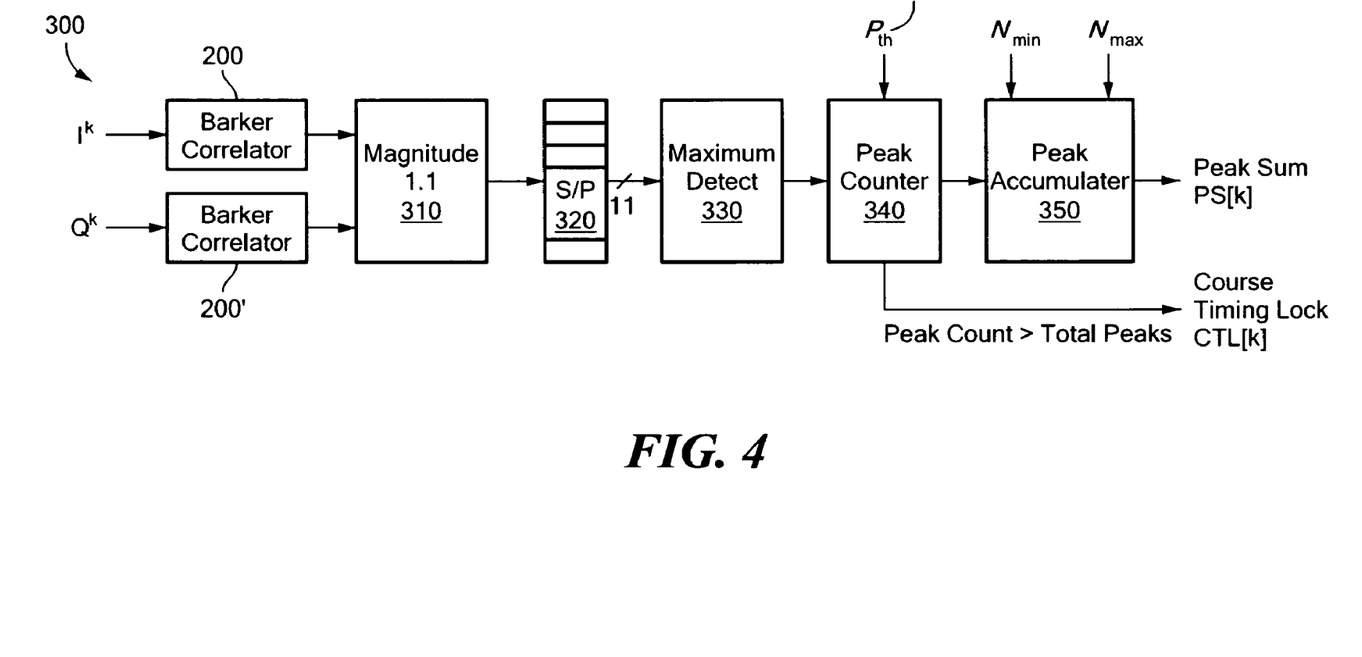
FIG. 4 is a block diagram of a barker correlator peak detector.

Referring now to FIG. 4, a barker correlation peak detector 300 is shown. In an 802.11b receiver, the digital baseband stream for a particular channel is generally a complex sequence based on a QPSK constellation (except for the 1 Mbps rate which uses BPSK signaling). Therefore, at chip rate, two Barker correlators 200 and 200' are used, one on each of the I/Q signals as shown. The magnitude (determined by circuit 310) of the despread I/Q chips are passed into an 11 stage Serial to Parallel (S/P) buffer 320. The peak magnitude is determined along with the offset (relative to the 11 element frame) by a maximum detect circuit 330. In the presence of an 802.11b preamble, this system produces amplitude peaks 11 chips apart. A peak threshold $P_{th}$ (designated 345) is used to filter out noise and potentially trivial solutions (e.g., when excited will all zero I/Q inputs). The threshold is usually set to a low value. Setting it to higher levels might result in valid packets with sufficient attenuation remaining undetected. A peak counter 340 is incremented if a valid peak occurs at the same relative offset position in successive 11 element frames. If the peak position changes between successive frames, the counter 340 is reset to zero. If the counter crosses a total peak threshold, a Coarse Timing Lock (CTL) signal 348 is asserted by the peak counter 340. A peak accumulator 350 accumulates the peak values as long as the peak counter is within a specified range [$N_{min}$, $N_{max}$]. If the peak counter 340 is reset the accumulator is also reset to zero. The CTL signal 348 is a good indicator of a valid incoming 802.11b packet. Fine timing adjustment involves choosing the optimum sampling phase, as described below.

Figure 5:
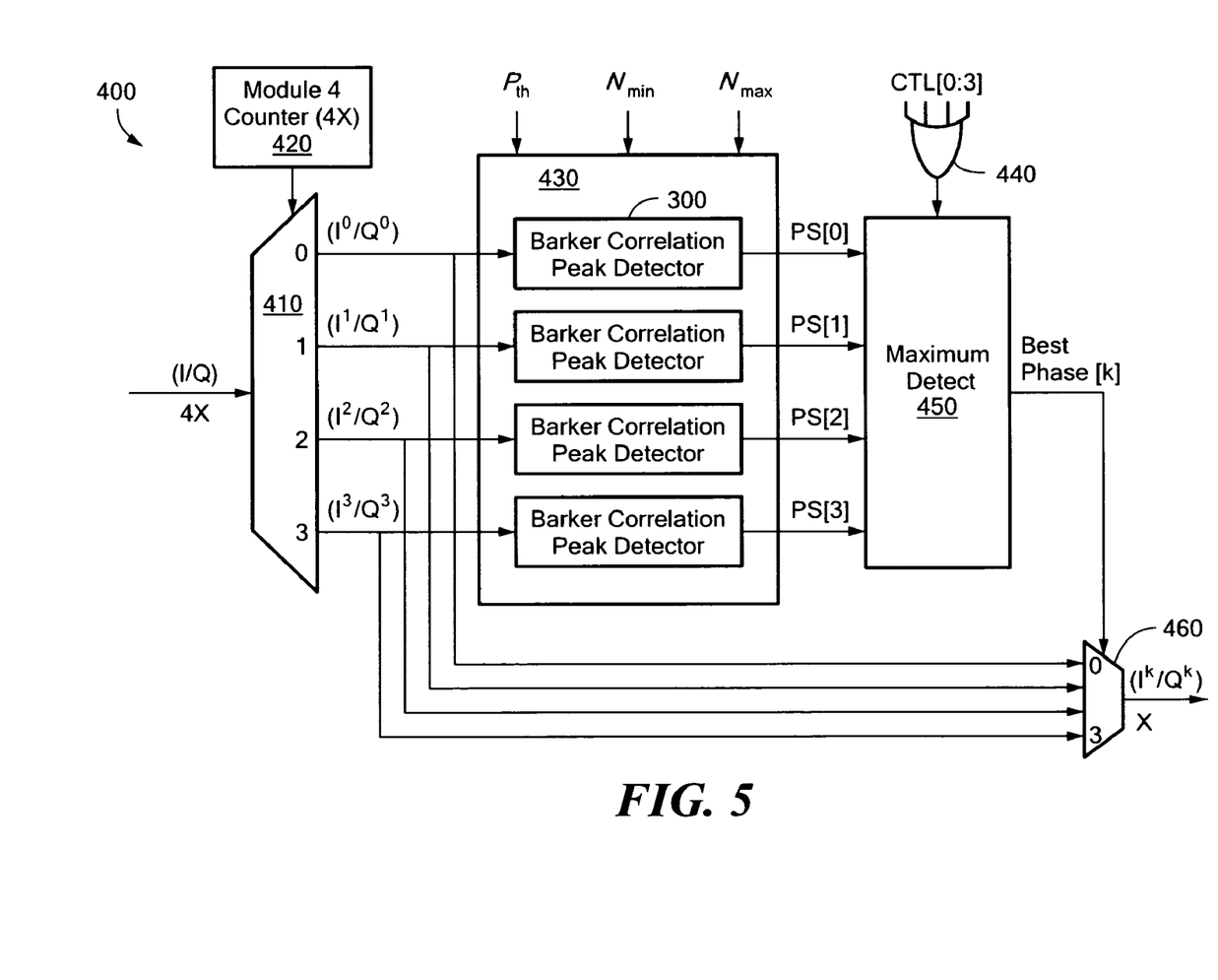
FIG. 5 is a block diagram of an optimum sampling phase selection circuit.

Referring now to FIG. 5, the optimum sampling phase selection circuitry 400 is shown. The Barker correlation peak detector circuit 300 is replicated 4 times to operate on 4 different sampling phases of a 4× oversampled digital baseband signal. A rotating demultiplexer 410 distributes the I/Q samples across the 4 downsampled phases. The demultiplexer 410 is controlled by a modulo 4 counter 420. Each of the downsampled phases is passed to a respective correlation peak detector. The optimum sampling phase is the phase that consistently produces peaks, 11 chips apart, with the maximum average correlation magnitude. As soon as any one of the phases asserts a CTL, the timing recovery process is stopped. The accumulator peak sum of each of the phases (PS[k]) is compared by Maximum Detect circuit 450 and the phase with the maximum peak sum is chosen as the optimum sampling phase. This best phase is output from multiplexor 460.

The probability of random data producing N consecutive peaks with the same relative offset is $1/11^{N-1}$. To prevent a particular phase from getting off to an unfair start with a random initial peak, asserting CTL, and ending up with the maximum peak sum, peak accumulation is only done within a peak count window. The accumulation process in each phase is started only when the peak counter crosses a minimum number of peaks. If the minimum peak count is $N_{min}$, the probability of an unfair start is $1/11^{N_{min}}$ (when the peak counter is at N, N+1 successive peaks have occurred). The accumulation process is stopped when the total peak count in any given phase exceeds a maximum value, $N_{max}$. CTL is asserted when the peak count reaches $N_{min}+N_{max}$. This guarantees that the peak sums are legitimate and that a bad phase is not chosen because it got off to an unfair start where a random peak position matched the next valid peak position. Typical values for $N_{min}$ and $N_{max}$ are 2 and 8 respectively. Once the optimum sampling phase is chosen, symbol timing is determined based on the relative offset of peaks in the chosen phase. The position of the peaks corresponds to the last chip of each preamble symbol.

Figure 6:
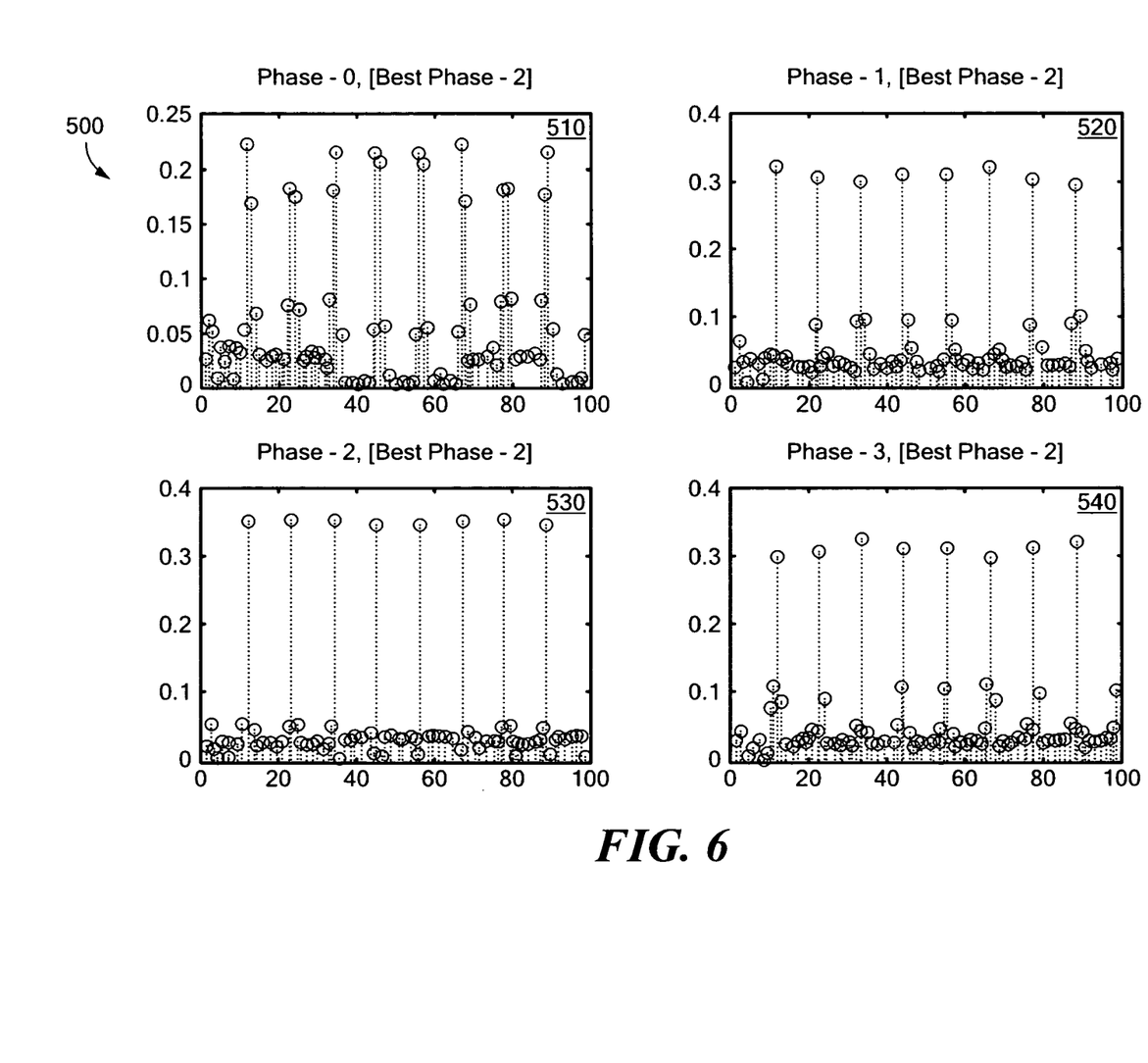
FIG. 6 is a series of graphs showing the correlation peaks of four phases.

An example of the method and apparatus of the present invention in action is shown in FIG. 6. In this case phase 2

Figure 7:
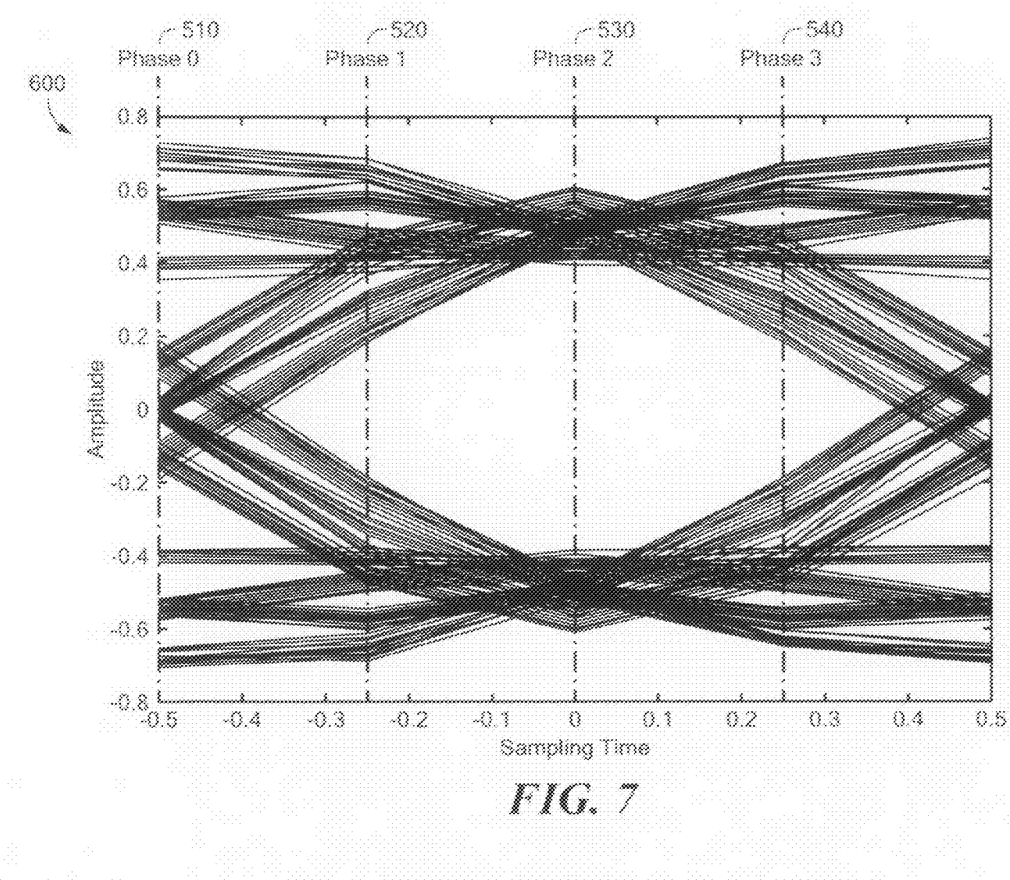
FIG. 7 shows the sampling phase (referred to as an eye diagram) of the received stream.

(530) was chosen as the optimum sampling phase. It can be seen that phase 2 produces the most consistent and highest magnitude correlation peaks when compared to phase 0 (510), phase 1 (520) and phase 3 (540). FIG. 7 shows the sampling phase (referred to an eye diagram 600) of the received stream. Once again, it is obvious that phase 2 is the best sampling phase as it maximizes the SNR by sampling the baseband signal at the maximum eye opening. With increased noise and multipath distortion, optimum sampling points are not as obvious visually. Modem performance tests have shown that the timing recovery method and apparatus is extremely robust in the presence of substantial multipath (approximately 100 ns root mean square delay spread), frequency offsets (approximately 50 ppm) and noise (3 dB SNR).

Oversampling by more than 4× the chip rate is usually overkill. The marginal performance improvement from higher sampling does not justify the linear increase in hardware/computational resources. For the wideband architecture shown in FIG. 1, it usually makes sense to downsample the 176 MHz (16×) stream after the filter stages to a 44 MHz (4×) stream and use the timing recovery method and apparatus shown in FIG. 5 with negligible loss in performance.

Figure 8:
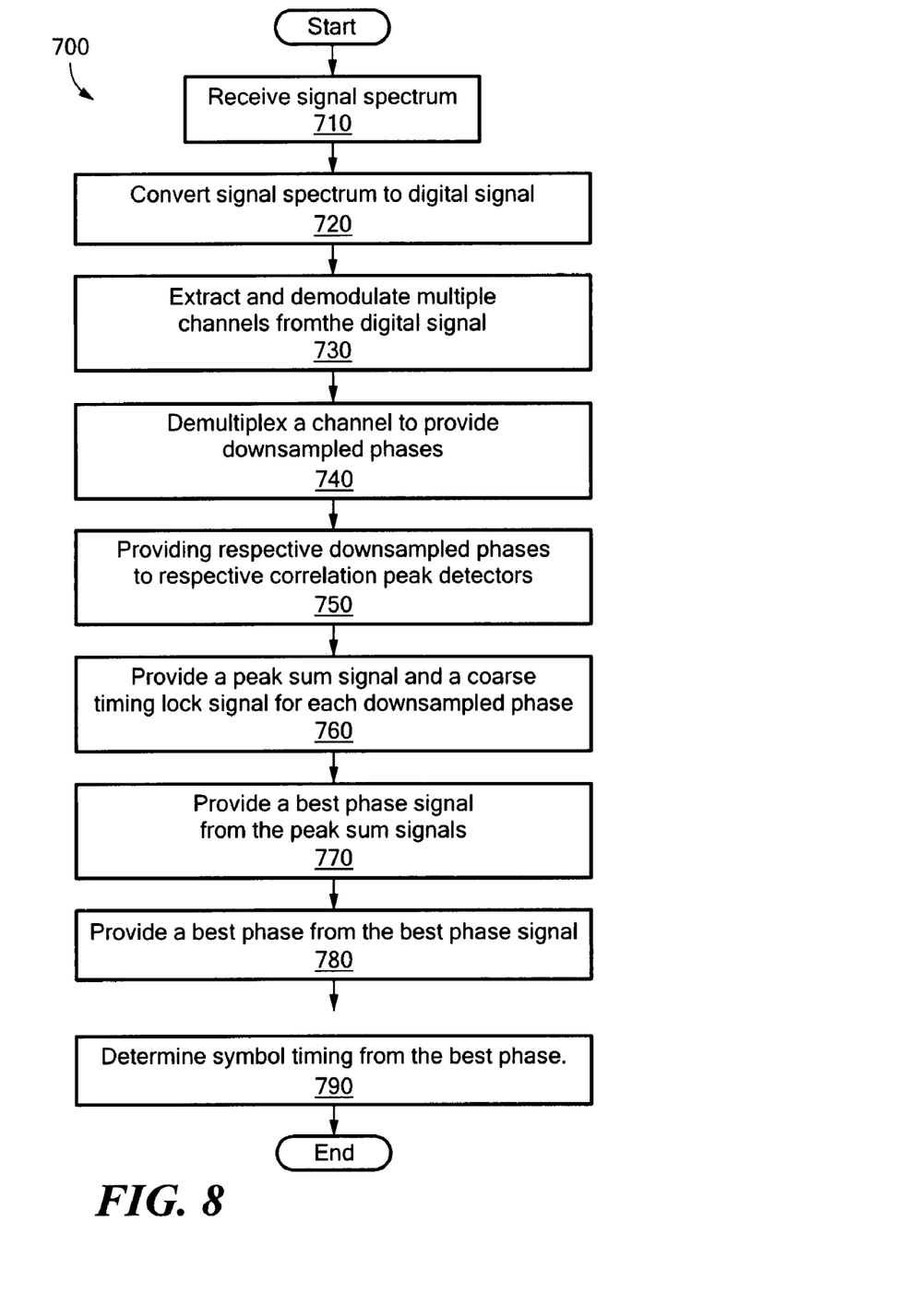
FIG. 8 is a block diagram of the method of performing digital timing recovery of the present invention.

A flow chart of the presently disclosed method is depicted in FIG. 8. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method starts and step 710 is executed. Step 710 discloses the step of receiving a signal spectrum. An 88 MHz signal spectrum is captured from a 2.4 GHz spectrum.

Step 720 recites converting the analog baseband signal into a digital signal stream. This is preferably accomplished by using a Digital-to-Analog converter, and most preferably with a 176 Msamples/second Digital-to-Analog converter.

Step 730 states that a plurality of channels are extracted and demodulated from the digital signal. In a preferred embodiment three channels are provided, however, any number of channels could be sued. The channel signal is oversampled. Oversampling is used to reduce noise and to improve the performance of the receiver.

Step 740 recites that the received channel signal is demultiplexed to provide a plurality of downsampled phases. While four downsampled phases are shown and discussed, it should be appreciated that any number of downsampled phases could be used.

Step 750 discloses that the downsampled phases are provided to respective correlation peak detectors. Each phase is provided with it's own correlation peak detector. Each correlation peak detector provides a peak sum signal and a coarse timing lock signal.

Step 760 states that a peak sum signal is provided for each downsampled phase. Since four phases are being analyzed, there will be a corresponding number of peak sum signals.

Step 770 discloses that a best phase signal is provided from analysis of the peak sum signals, as well as the coarse timing lock signals.

Step 780 recites that a best downsampled phase is provided by way of the best phase signal.

Step 790 discloses that symbol timing is determined from the best downsampled phase. This determination is based on the relative offset of peaks in the chosen phase. The position of the peaks corresponds to the last chip of each preamble symbol. The process ends after this step.

A digital baseband timing recovery method and apparatus for 802.11b Wireless Local Area Network (WLAN) receivers has been described. The method and apparatus are suitable for oversampled physical layer streams. The method and apparatus exploits the Barker sequence present in the packet's preamble and uses a multiple sampling phase peak search criterion that is robust in the presence of significant multipath fading and frequency offsets. The search criterion is scalable and programmable.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. An apparatus comprising:
an antenna;
a front end receiving a signal spectrum from said antenna;
an A/D converter coupled to said frontend and digitizing said received signal spectrum;
a digital baseband processor in communication with said A/D converter and extracting and demodulating a plurality of individual channels from the digitized signal spectrum; and
an optimum sampling phase selection circuit receiving one of said individual channels and determining an optimum sampling phase from said one of said individual channels, the optimum phase selection circuit comprising:
a demultiplexor receiving an oversampled digital baseband signal at an input and providing a plurality of downsampled phases at respective outputs;
a correlation detector receiving said plurality of downsampled phases and providing a respective phase to a respective correlation peak detector, said correlation peak detector providing a peak sum signal for each downsampled phase;
a maximum detect circuit receiving said peak sum signal for each downsampled phase from said correlation detector and providing an optimum phase output signal; and
a multiplexor receiving said plurality of downsampled phases and receiving said optimum phase output signal from said maximum detect circuit, said multiplexor providing one of said downsampled phases as an optimum phase at an output such that symbol timing is determined based on the relative offset peaks in said optimum phase.

2. The apparatus of claim 1 wherein said frontend captures approximately 88 MHz of a spectrum at approximately 2.4 GHz.

3. The apparatus of claim 1 wherein said A/D converter comprises a 176 Msamples/second converter.

4. The apparatus of claim 1 wherein said digital base band processor comprises a digital mixer, a filter coupled to said mixer and a demodulator coupled to said filter for each of said plurality of channels.

5. The apparatus of claim 1 wherein said digital baseband processor provides a four times oversampled signal.

6. The apparatus of claim 1 wherein said plurality of individual channels comprises 3 channels.

7. An optimum sampling phase selection circuit comprises:
 a demultiplexor receiving an oversampled digital baseband signal at an input and providing a plurality of downsampled phases at respective outputs;
 a correlation detector receiving said plurality of downsampled phases and providing a respective phase to a respective correlation peak detector, said correlation peak detector providing a peak sum signal for each downsampled phase;
 a maximum detect circuit receiving said peak sum signal for each downsampled phase from said correlation detector and providing an optimum phase output signal; and
 a multiplexor receiving said plurality of downsampled phases and receiving said optimum phase output signal from said maximum detect circuit, said multiplexor providing one of said downsampled phases as an optimum phase at an output such that symbol timing is determined based on the relative offset peaks in said optimum phase.

8. The apparatus of claim 7 wherein said correlation detector comprises:
 a first Barker correlator receiving an In-phase chip stream;
 a second Barker correlator receiving a Quadrature chip stream;
 a magnitude circuit coupled to said first Barker correlator and said second Barker correlator;
 a Serial to Parallel (S/P) buffer coupled to said magnitude circuit,
 a maximum detect circuit coupled to said S/P buffer;
 a peak counter coupled to said maximum detect circuit; and
 a peak accumulator coupled to said peak counter.

9. The optimum sampling phase selection circuit of claim 7, wherein the correlation peak detector further provides a coarse timing lock signal to said maximum detect circuit.

10. A method comprising:
 receiving a signal spectrum;
 converting said signal spectrum to a digital signal;
 extracting and demodulating a plurality of individual channels from said digital signal;
 determining an optimum phase from one of said channels, the determining of said optimum phase comprising
 receiving one of said plurality of channels at an input of a demultiplexor;
 demultiplexing said channel to provide a plurality of downsampled phases at respective outputs;
 receiving said downsampled phases and providing a respective downsampled phase to a respective correlation peak detector;
 providing a peak sum signal and a coarse timing lock signal for each downsampled phase;
 receiving said peak sum signal and said coarse timing lock signal for each downsampled phase and providing an optimum phase output signal; and
 receiving said downsampled phases and receiving said optimum phase output signal, and providing one of said downsampled phases as an optimum phase at an output; and
 determining symbol timing based on relative offset peaks in said optimum phase.

11. The method of claim 10 wherein said receiving a signal spectrum comprises capturing approximately 88 MHz of a spectrum at approximately 2.4 GHz.

12. The method of claim 10 wherein said converting comprises converting with a 176 Msamples/second converter.

13. The method of claim 10 wherein said extracting and demodulating comprises:
 mixing, filtering and demodulating said digital signal to provide said plurality of individual channels.

14. The method of claim 10 wherein said extracting and demodulating comprises providing a four times oversampled signal.

15. The method of claim 10 wherein said plurality of individual channels comprises 3 channels.

16. A method of determining a best phase comprising:
 receiving one of said plurality of channels at an input of a demultiplexor;
 demultiplexing said channel to provide a plurality of downsampled phases at respective outputs;
 receiving said downsampled phases and providing a respective downsampled phase to a respective correlation peak detector;
 providing a peak sum signal for each downsampled phase;
 receiving said peak sum signal for each downsamnpled phase and providing an optimum phase output signal; and
 receiving said downsampled phases and receiving said optimum phase output signal, and providing one of said downsampled phases as an optimum phase at an output,
 wherein the step of providing a peak sum signal further comprises the substep of providing a coarse timing lock signal for each downsampled phase, and the step of receiving said peak sum signal for each downsampled phase further comprises receiving said coarse timing lock signal for each downsampled phase.

17. The method of claim 16 wherein said providing a peak sum signal and a coarse timing lock signal comprises:
 receiving an In-phase chip stream;
 receiving a Quadrature chip stream;
 determining a magnitude of said chip streams;
 converting said chip streams to a parallel stream;
 determining peaks of said parallel stream;
 counting said peaks to provide a coarse timing lock signal; and
 accumulating said peaks to provide a peak sum signal.

* * * * *